United States Patent
Feng et al.

(10) Patent No.: US 12,048,290 B1
(45) Date of Patent: Jul. 30, 2024

(54) RECEIVER OF INTERACTIVE DOG TRAINING DEVICE AND INTERACTIVE DOG TRAINING DEVICE

(71) Applicant: Shenzhen SmartPet Technology Co., Ltd., Shenzhen (CN)

(72) Inventors: Wenjing Feng, Guangdong (CN); Junyong Zhang, Guangdong (CN)

( * ) Notice: Subject to any disclaimer, the term of this patent is extended or adjusted under 35 U.S.C. 154(b) by 0 days.

(21) Appl. No.: 18/585,775

(22) Filed: Feb. 23, 2024

(30) Foreign Application Priority Data

Jan. 29, 2024 (CN) .......................... 202420225000.0

(51) Int. Cl.
*A01K 15/02* (2006.01)
*G08C 17/02* (2006.01)

(52) U.S. Cl.
CPC ............ *A01K 15/021* (2013.01); *G08C 17/02* (2013.01)

(58) Field of Classification Search
CPC .................................................. A01K 15/021
See application file for complete search history.

(56) References Cited

U.S. PATENT DOCUMENTS

| | | | | |
|---|---|---|---|---|
| 7,434,541 B2* | 10/2008 | Kates | ..................... | A01K 15/02 119/908 |
| 7,819,087 B2* | 10/2010 | Napolez | ............... | A01K 15/021 119/721 |
| 8,839,744 B1* | 9/2014 | Bianchi | ................ | A01K 15/021 340/573.3 |
| 8,869,748 B2* | 10/2014 | Yin | .......................... | A01K 5/02 119/51.02 |

* cited by examiner

*Primary Examiner* — Yvonne R Abbott-Lewis

(57) ABSTRACT

The present disclosure provides a receiver of an interactive dog training device and an interactive dog training device. The receiver includes a dog training module, a speaker module, a storage module configured to store user sound data, a first communication module configured to receive an interaction control signal and a dog training control signal which are sent by a dog training controller, and a control module electrically connected to the dog training module, the speaker module, the storage module, and the first communication module. The control module is configured to receive the interaction control signal and the dog training control signal through the first communication module, obtain the user sound data according to the interaction control signal, and play the obtained user sound data through the speaker module, so that remote interactions between a user and a target dog are achieved, and the intimacy with the target dog is improved.

20 Claims, 9 Drawing Sheets

RECEIVER OF INTERACTIVE DOG TRAINING DEVICE AND INTERACTIVE DOG TRAINING DEVICE

CROSS-REFERENCE TO RELATED APPLICATIONS

The application claims priority of Chinese patent application CN2024202250000, filed on Jan. 29, 2024, which is incorporated herein by reference in its entireties.

TECHNICAL FIELD

The present disclosure relates to the technical field of target dog supplies, and in particular, to a receiver of an interactive dog training device and an interactive dog training device.

BACKGROUND

With the continuous improvement of people's care for target dogs, the demand for cultivating and training the target dogs is also increasing. Traditional dog training methods mainly rely on artificial education and commands, but these methods have some inconveniences: For example, the owner needs to be present in person, and the feedback time is limited. Therefore, there is an urgent need for an interactive dog training device on the market. The owner can output a preset sound instruction to the dog through remote control, and provide dog training stimulation, so as to provide a more targeted training experience for the dog, thereby achieving interactions with the target dog and achieving the purpose of training the target dog.

SUMMARY

The present disclosure mainly aims to provide a receiver of an interactive dog training device and an interactive dog training device, which can output a preset sound instruction to a dog through remote control and provide dog training stimulation, thereby achieving interactions with a target dog and achieving the purpose of training the target dog.

The technical solution adopted by the present disclosure to solve the technical problem is as follows.

In the first aspect, the present disclosure provides a receiver of an interactive dog training device, including:
- a dog training module;
- a speaker module;
- a storage module, configured to store user sound data;
- a first communication module, configured to: communicate with a dog training controller and receive an interaction control signal and a dog training control signal which are sent by a dog training controller; and
- a control module, electrically connected to the dog training module, the speaker module, the storage module, and the first communication module, wherein the control module is configured to receive the interaction control signal and the dog training control signal through the first communication module, obtain the user sound data according to the interaction control signal, and then play the obtained user sound data through the speaker module; and the control module is further configured to provide dog training stimulation to the target dog according to the dog training control signal for dog training.

Further, there are a plurality of groups of the user sound data and a plurality of interaction control signals, and each interaction control signal corresponds to one group of user sound data.

Further, the receiver of the interactive dog training device further includes a sensing module electrically connected to the control module; the sensing module includes a sound collection unit; the sound collection unit is configured to pick up a sound, convert the picked sound into a sound signal, and output the sound signal to the control module; and the control module is also configured to receive the sound signal and send the sound signal to the dog training controller through the first communication module.

Further, the control module is also configured to analyze the number of times of barking of the target dog within a preset time range according to the sound signal and/or analyze a barking state of the target dog to obtain state data of the target dog, and send the number of times of barking and the state data to the dog training controller through the first communication module.

Further, the state data includes data of the number of times of barking of the target dog of one day, one week, or one month.

Further, a barking template is preset inside the control module; the control module is also configured to match the sound signal with the preset barking template; when the control module determines that the sound signal is a barking state corresponding to the barking template, the control module obtains the barking state corresponding to the barking template as the state data and transmits the state data to the dog training controller through the first communication module; and the barking template includes at least one barking state representing hunger, fear, alertness, anger, grievance, sadness, illness, excitement, and agitation.

Further, the sensing module further includes a physiological parameter sensing unit; and the physiological parameter sensing unit is configured to detect at least one of a body temperature, a heart rate, a blood pressure, sleep time, exercise steps, and exercise energy consumption of the target dog; and the control module is also configured to send at least one of the body temperature, the heart rate, the blood pressure, the sleep time, the exercise steps, and the exercise energy consumption of the target dog to the dog training controller.

Further, the sensing module further includes a distance sensing unit configured to sense a distance between the receiver of the interactive dog training device and an interaction controller or a preset position; and when the distance is greater than or equal to a preset distance value, the control module sends an over range reminding signal to the dog training controller.

Further, the receiver of the interactive dog training device further includes a recording module, and the control module is further configured to: control the recording module to record the user sound data and store the user sound data in the storage module.

Further, the receiver includes a first housing, and a first circuit board and a first battery which are arranged inside the first housing; the storage module, the first communication module, and the control module are all arranged on the first circuit board; the dog training module is arranged on the first housing; the speaker module is arranged inside the first housing; the speaker module includes a speaker; and the first housing is provided with a sound outlet at a position corresponding to the speaker.

Further, the dog training module includes at least one of a sound stimulation dog training unit, an electrical stimulation dog training unit, a vibration dog training unit, and an ultrasonic dog training unit.

Further, the electric stimulation dog training unit is a conducting column; the vibration dog training unit is a vibration motor; the speaker and the first battery are both located on the same side of the first circuit board; the conducting column is electrically connected to the first battery; the vibration motor and the conducting column are both located on one side of the first circuit board away from the speaker; the conducting column at least partially protrudes out of an outer side of the first housing;

the first housing is provided with avoidance ports at two ends of one side close to the conducting column, and crossbars configured to fix a collar are arranged on the avoidance ports.

In another aspect, the present disclosure also provides an interactive dog training device, including the receiver described above and the dog training controller.

Further, at least one of the dog training controller or the receiver of the interactive dog training device is configured to be in communication connection with an external intelligent terminal to feed back target dog- or environment-related data to the intelligent terminal.

Further, the dog training controller has a dog training control button and an interaction control button; when the dog training control button is operated, the dog training controller sends the dog training control signal; and when the interaction control button is operated, the dog training controller sends the interaction control signal.

Further, the dog training controller further includes a switching button; there are at least two receivers; the dog training controller is configured to be in communication connection with the at least two receivers; and the switching button is configured to switch control of the dog training controller over the at least two receivers.

Further, the dog training controller further includes a locking button; when the locking button is at a first position, a function of the dog training control button and a function of the interaction control button are locked; and when the locking button is at a second position, the dog training control button and the interaction control button are used and operated normally.

Further, the dog training controller further includes a rotation button; the rotation button is configured to be operated to control a grade of the dog training stimulation; the dog training controller further includes a lighting module and a lighting control button; and the lighting control button is configured to control turning on and turning off of the lighting module.

Further, the dog training controller includes a second housing, a second circuit board, a second battery, a display module, and a second communication module; the second communication module includes an antenna, and the display module is mounted on the second housing; the second battery, the antenna, and the second circuit board are arranged in the second housing and are electrically connected to each other; and the dog training control button, the interaction control button, the switching button, the lighting module, the locking button, and the rotation button are all arranged on the second housing and are all electrically connected to the second circuit board.

Further, the dog training control button and the interaction control button are located on a front surface of the second housing, and the locking button and the lighting control button are respectively arranged on two opposite side walls of the second housing; the rotation button, the lighting module, and the antenna are arranged at a top of the second housing; and the lighting module is located between the rotation button and the antenna.

The present disclosure has the following beneficial effects: Compared with the prior art, the receiver of the interactive dog training device of the present disclosure receives the interaction control signal and the dog training control signal remotely provided by a user, and calls corresponding sound data according to the interaction control signal to play a corresponding audio, thereby achieving remote interactions between the user and the target dog and improving the intimacy with the target dog. Furthermore, the control module further outputs the dog training stimulation through the dog training module according to the dog training control signal, which solves the problem that the existing owner of the target dog is absent. By cooperation with interaction sounds, the target dog is punished through the stimulation when it does not cooperate, so as to achieve the purpose of remote dog training.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Figure 1:
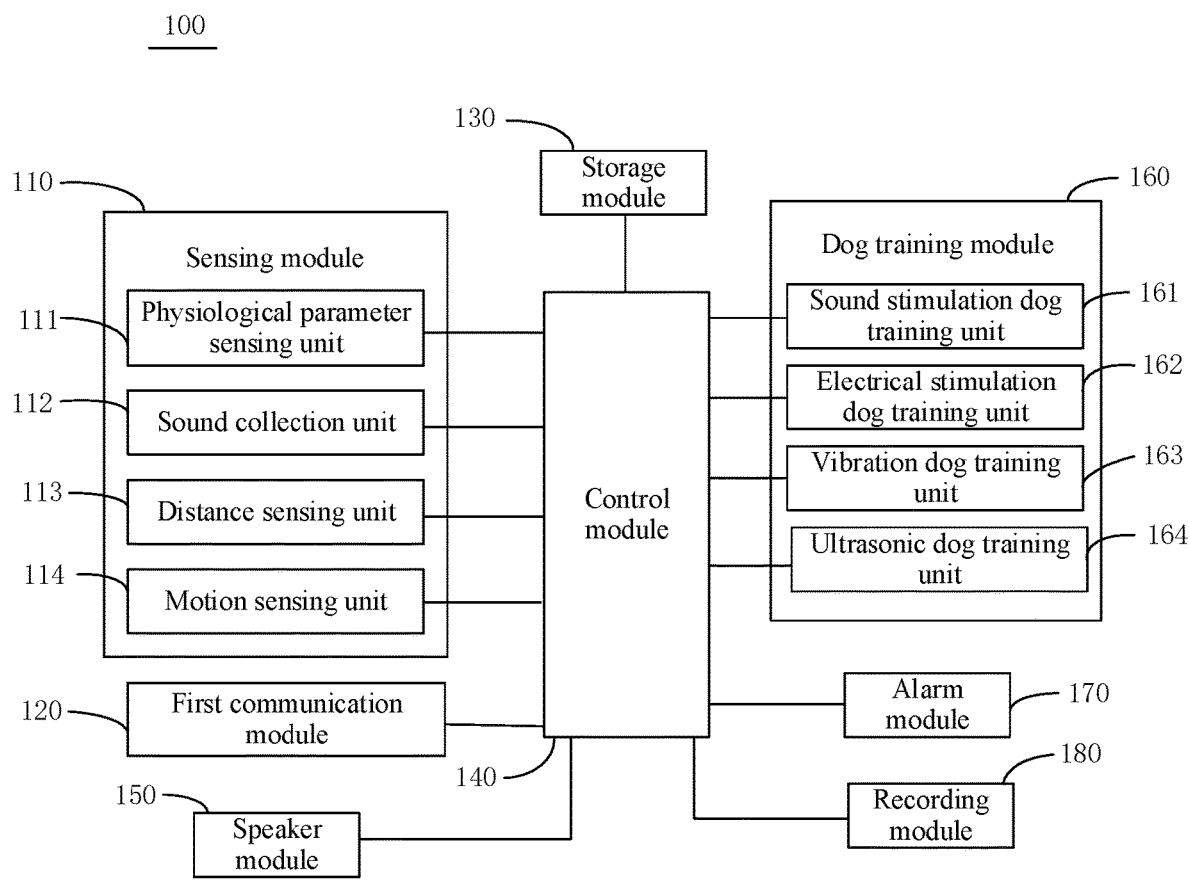
FIG. 1 is a schematic block diagram of a receiver according to the present disclosure.

Referring to FIG. 1, embodiments of the present disclosure provide a receiver 100 of an interactive dog training device.

The receiver 100 of the interactive dog training device includes: a dog training module 160; a speaker module 150; a storage module 130, configured to store user sound data; a first communication module 120, configured to communicate with a dog training controller 200 and receive an interaction control signal and a dog training control signal which are sent by the dog training controller 200; and a control module 140, electrically connected to the dog training module 160, the speaker module 150, the storage module 130, and the first communication module 120. The control module 140 is configured to receive the interaction control signal and the dog training control signal through the first communication module 120, obtain the user sound data according to the interaction control signal, and then play the obtained user sound data through the speaker module 150; and the control module 140 is also configured to provide dog training stimulation to a target dog according to the dog training control signal for dog training.

The receiver 100 of the interactive dog training device in this embodiment receives the interaction control signal and the dog training control signal remotely provided by a user, and calls corresponding sound data according to the interaction control signal to play a corresponding audio, thereby achieving remote interactions between the user and the target dog and improving the intimacy with the target dog. Furthermore, the control module 140 further outputs dog training stimulation through the dog training module 160 according to the dog training control signal, which solves the problem that the existing owner of the target dog is absent. By cooperation with interaction sounds, the target dog is punished through the stimulation when it does not cooperate, so as to achieve the purpose of remote dog training.

Specifically, in this embodiment, there are a plurality of groups of the user sound data and a plurality of interaction control signals, and each interaction control signal corresponds to one group of user sound data.

It should be noted that the user sound data is audio data and is pre-stored on the control module 140, and all the pieces of user sound data are different audios. When the user outputs a first kind of interaction control signal through the dog training controller 200, the control module 140 plays the audio data corresponding to the first kind of interaction control signal through the speaker module 150. If the audio data corresponding to the first kind of interaction control signal is "sit down", the speaker module 150 plays "sit down". The user outputs a second kind of interaction control signal through the dog training controller 200. Assuming that the audio data corresponding to the second kind of interaction control signal is "New Year's greetings", the speaker module 150 plays "New Year's greetings"; and the like. The interaction control signal and the user sound data are not limited here.

In an embodiment, the receiver 100 of the interactive dog training device further includes a sensing module 110 electrically connected to the control module 140. The sensing module 110 includes a sound collection unit 112. The sound collection unit 112 is configured to pick up a sound, convert the picked sound into a sound signal, and output the sound signal to the control module 140. The control module 140 is also configured to receive the sound signal and send the sound signal to the dog training controller 200 through the first communication module 120, so that the user can monitor a daily state of the target dog.

Specifically, the control module 140 is also configured to analyze the number of times of barking of the target dog within a preset time range according to the sound signal and/or analyze a barking state of the target dog to obtain state data of the target dog, and send the state data to the dog training controller 200 through the first communication module 120. The preset time can be a certain time period of a day, one day, one week, one month, or the like. The state data refers to the barking state of the target dog or data of the number of times of barking of the target dog within a certain time period of a day, one day, one week, one month, or the like. According to the number of times of barking of the target dog, the user can better train the target dog according to these data, which reduces the adverse effects of pet raising on people around. The dog training controller 200 can obtain the state of the target dog in real time, so that the user knows a current state of the target dog and considers, based on the current state of the target dog, whether the user needs to take measures, such as looking after a sick dog and pacifying the emotion. This is of great significance for ensuring healthy raising of pet dogs.

A barking template is preset inside the control module 140; the control module 140 is also configured to match the sound signal with the preset barking template; and when the control module 140 determines that the sound signal is a barking state corresponding to the barking template, the control module 140 obtains the barking state corresponding to the barking template as the state data and transmits the state data to the dog training controller 200 through the first communication module 120. The barking state is at least one of hunger, fear, alertness, anger, grievance, sadness, illness, excitement, and agitation, that is, the barking template includes at least one of the following barking states: hunger, fear, alertness, anger, grievance, sadness, illness, excitement, and agitation. By analysis of the barking state, it can help the user monitor the emotion of the target dog, strengthen interaction between the user and the target dog, and also timely pacify the target dog when the target dog is in a negative emotion. This improves the user experience.

In an embodiment, the sensing module 110 further includes a motion sensing unit 114 electrically connected to the control module 140, and the motion sensing unit 114 is configured to detect and obtain a motion signal of the target dog. The control module 140 is further configured to: receive the sound signal and the motion signal of the target dog, determine, according to the motion signal of the target dog, whether the sound signal is a barking signal of the target dog, and if a determining result is yes, analyze the sound signal.

It should be noted that the motion sensing unit 114 can be an accelerometer, a gyroscope, a motion sensor, and the like. Furthermore, when the receiver 100 is worn around the neck of the target dog, the motion sensing unit 114 is located at a position abutting against the larynx of the target dog. When the target dog barks, the motion sensing unit 114 can detect the movement of the larynx of the target dog, thereby feeding back the motion signal to the control module 140. The controller can determine, according to the motion signal and the sound signal, that the sound signal is barking of the target dog wearing the receiver 100, so as to analyze the sound signal. To prevent the barking of other dogs from being collected by the sound collection unit 112 in the receiver 100, the control module 140 also analyzes the sound signal collected by the sound collection unit 112, which affects the number of times of barking of the target dog and the authenticity of the barking state data of the target dog, and improves the accuracy of monitored data of the target dog.

In an embodiment, the sensing module 110 further includes a physiological parameter sensing unit 111. The physiological parameter sensing unit 111 can be a temperature sensor, a heart rate sensor, an accelerator, and the like, to detect at least one of a body temperature, a heart rate, a blood pressure, sleep time, exercise steps, and exercise energy consumption of the target dog through the physiological parameter sensing unit 111. The control module 140 is further configured to send at least one of the body temperature, the heart rate, the blood pressure, the sleep time, the exercise steps, and the exercise energy consumption of the target dog to the dog training controller 200 through the first communication module 120, so that the user can detect a health condition of the target dog, and timely send the target dog to see a doctor if data in the health condition of the target dog is abnormal, so as to avoid the target dog from having an accident.

In an embodiment, the sensing module 110 further includes a distance sensing unit 113 electrically connected to the control module 140 and configured to sense a distance between the receiver 100 of the interactive dog training device and an interaction controller or a preset position. When the distance is greater than or equal to a preset distance value, the control module 140 sends an over range reminding signal to the dog training controller 200, so that the user can monitor whether the target dog is in a designated region. In addition, the user can be informed when the target dog is over range, so that the user can make a response and prevent the target dog from walking far away. In this way, searching for the target dog can also be achieved, so that an auxiliary effect of searching for the target dog can be achieved. Specifically, the distance sensing unit 113 can be a positioning module, a global positioning system (GPS) module, a Beidou module, and the like.

In an embodiment, the receiver 100 of the interactive dog training device further includes an alarm module 170, and the alarm module 170 is electrically connected to the control module 140. The control module 140 is further configured to: feed back an abnormal number of times of barking and an abnormal barking state to the user, and drive the alarm module 170 to sound an alarm, to remind the user or people around to take measures when the target dog is abnormal, so as to prevent an accident. Specifically, the alarm module 170 can include a sound alarm module 170, a vibration alarm module 170, a light alarm module 170, and the like.

In an embodiment, the receiver 100 of the interactive dog training device further includes a recording module 180 electrically connected to the control module 140. The control module 140 is further configured to: control the recording module 180 to record the user sound data and store the user sound data in the storage module 130, so that when interacting with the target dog, the receiver 100 of the interactive dog training device plays the sound of the owner to get closer to the target dog. The target dog can perform actions better according to instructions, which enhances the interaction effect. Furthermore, recording the user sound data through the recording module 180 meets the requirement for recording desired sounds by the user, which improves the use experience.

In an embodiment, the dog training module 160 includes at least one of a sound stimulation dog training unit 161, an electrical stimulation dog training unit 162, a vibration dog training unit 163, and an ultrasonic dog training unit 164.

Figure 2:
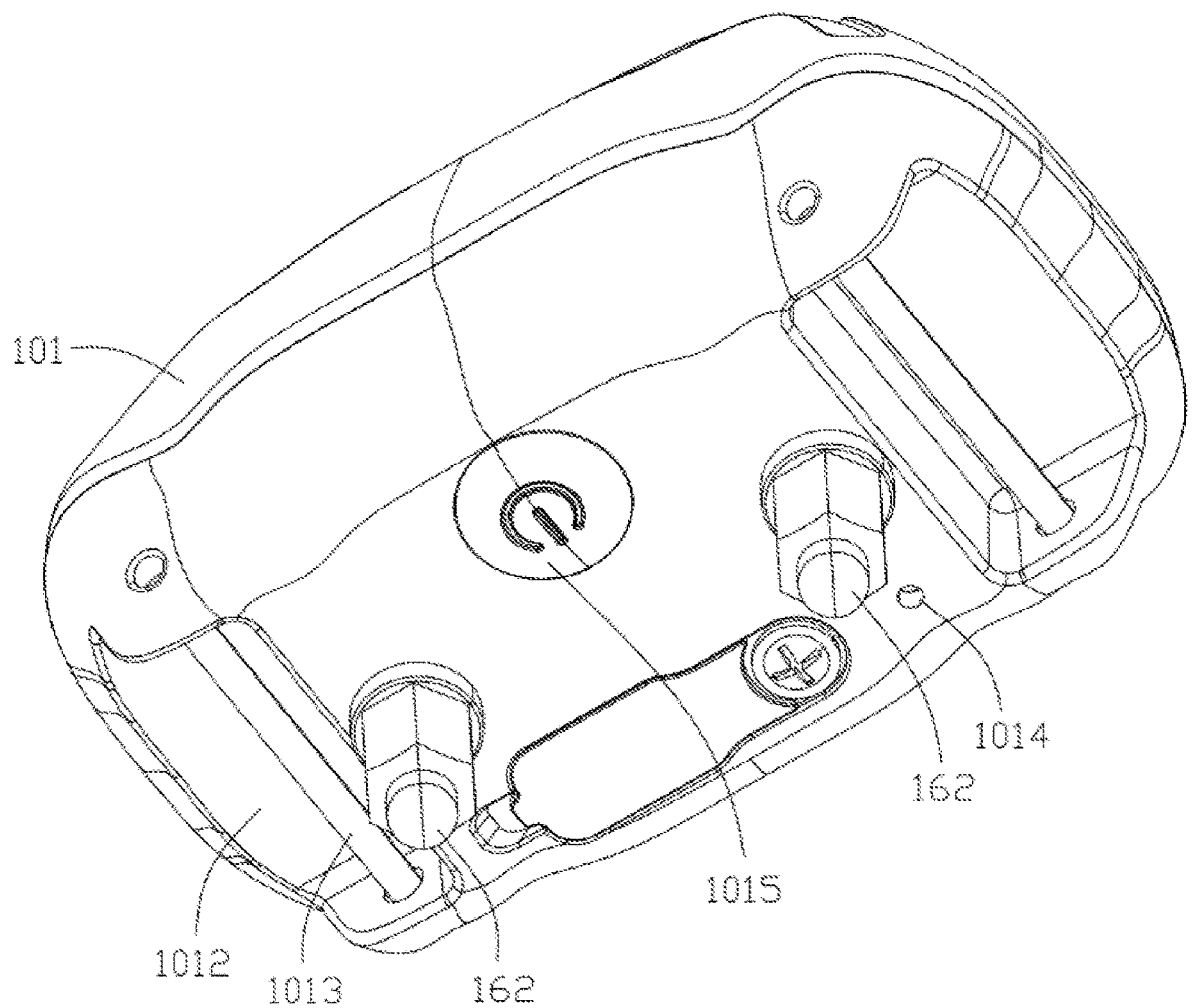
FIG. 2 is a three-dimensional diagram of a receiver according to the present disclosure.
Figure 3:
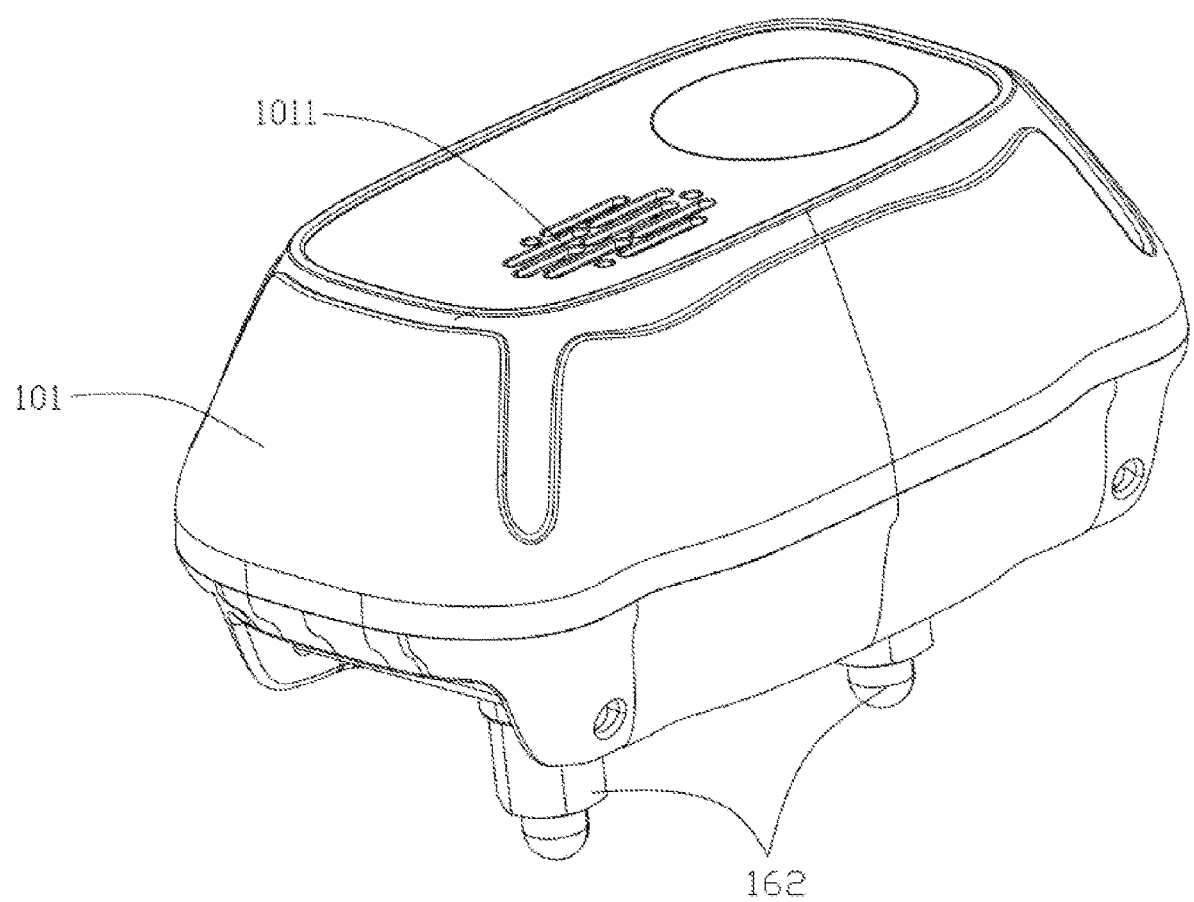
FIG. 3 is a three-dimensional diagram of a receiver in another viewing angle according to the present disclosure.
Figure 4:
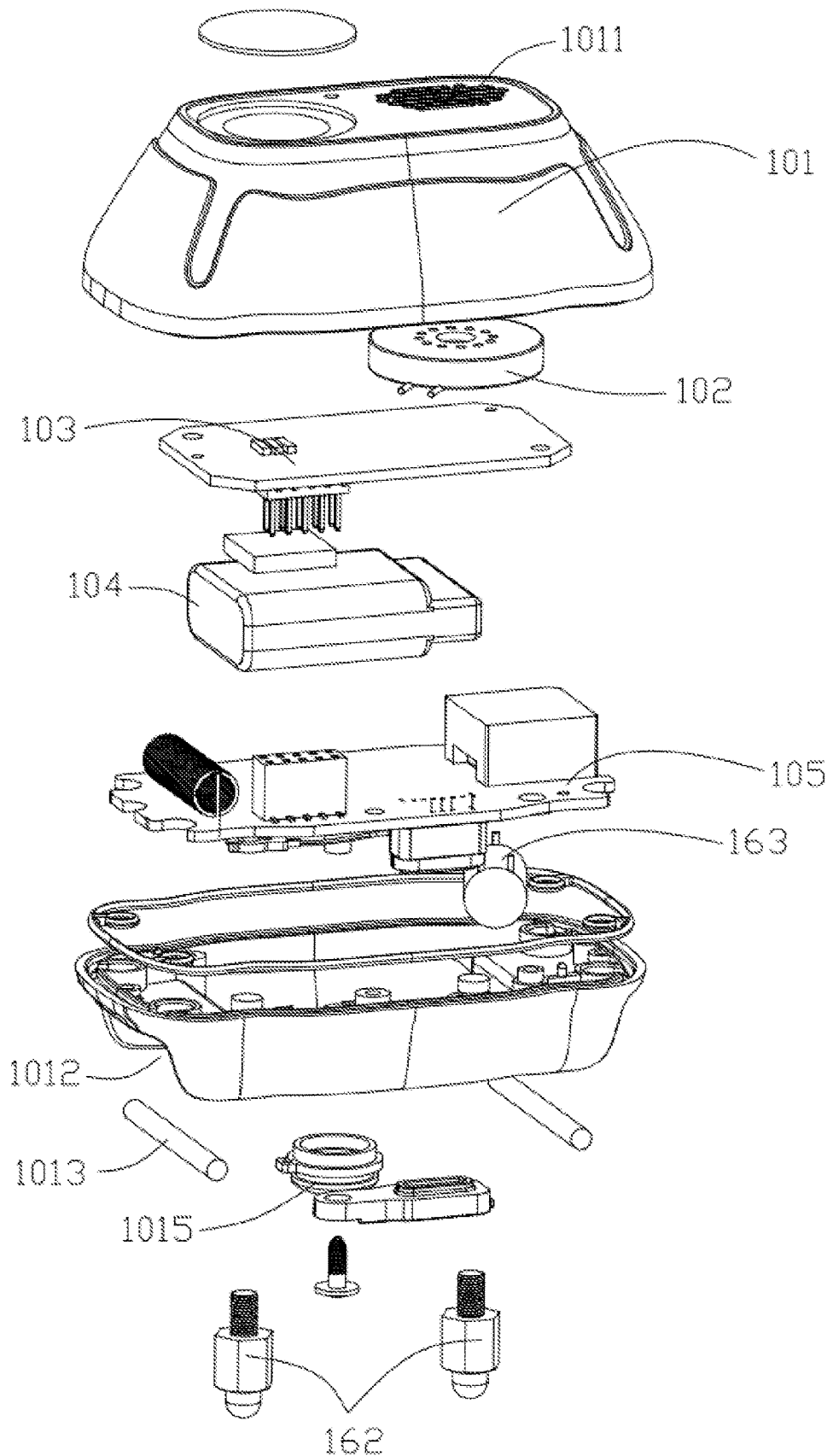
FIG. 4 is an exploded view of a receiver according to the present disclosure.
Figure 5:
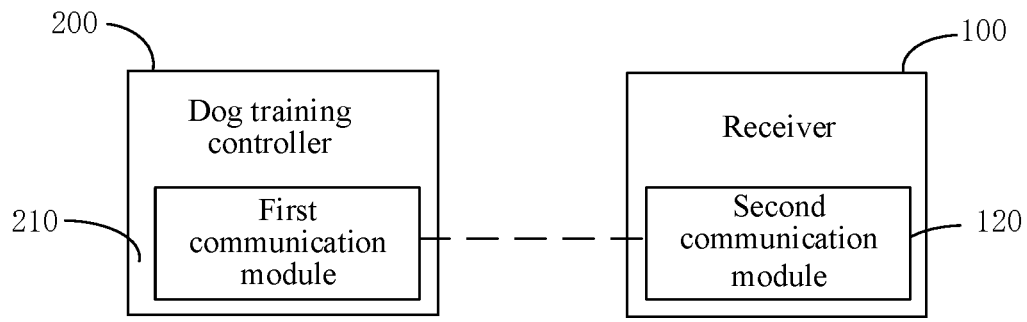
FIG. 5 is a schematic block diagram of an interactive dog training device according to the present disclosure.
Figure 6:
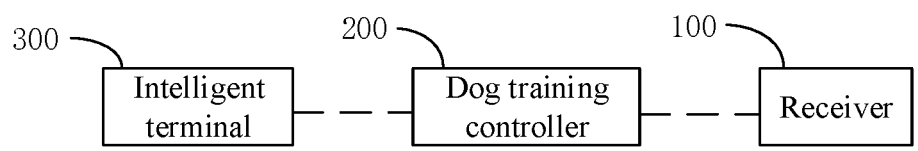
FIG. 6 is a schematic diagram of communication between an interactive dog training device and an intelligent terminal according to the present disclosure.
Figure 7:
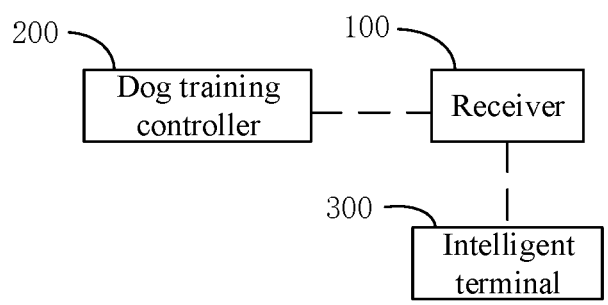
FIG. 7 is another schematic diagram of communication between an interactive dog training device and an intelligent terminal according to the present disclosure.
Figure 8:
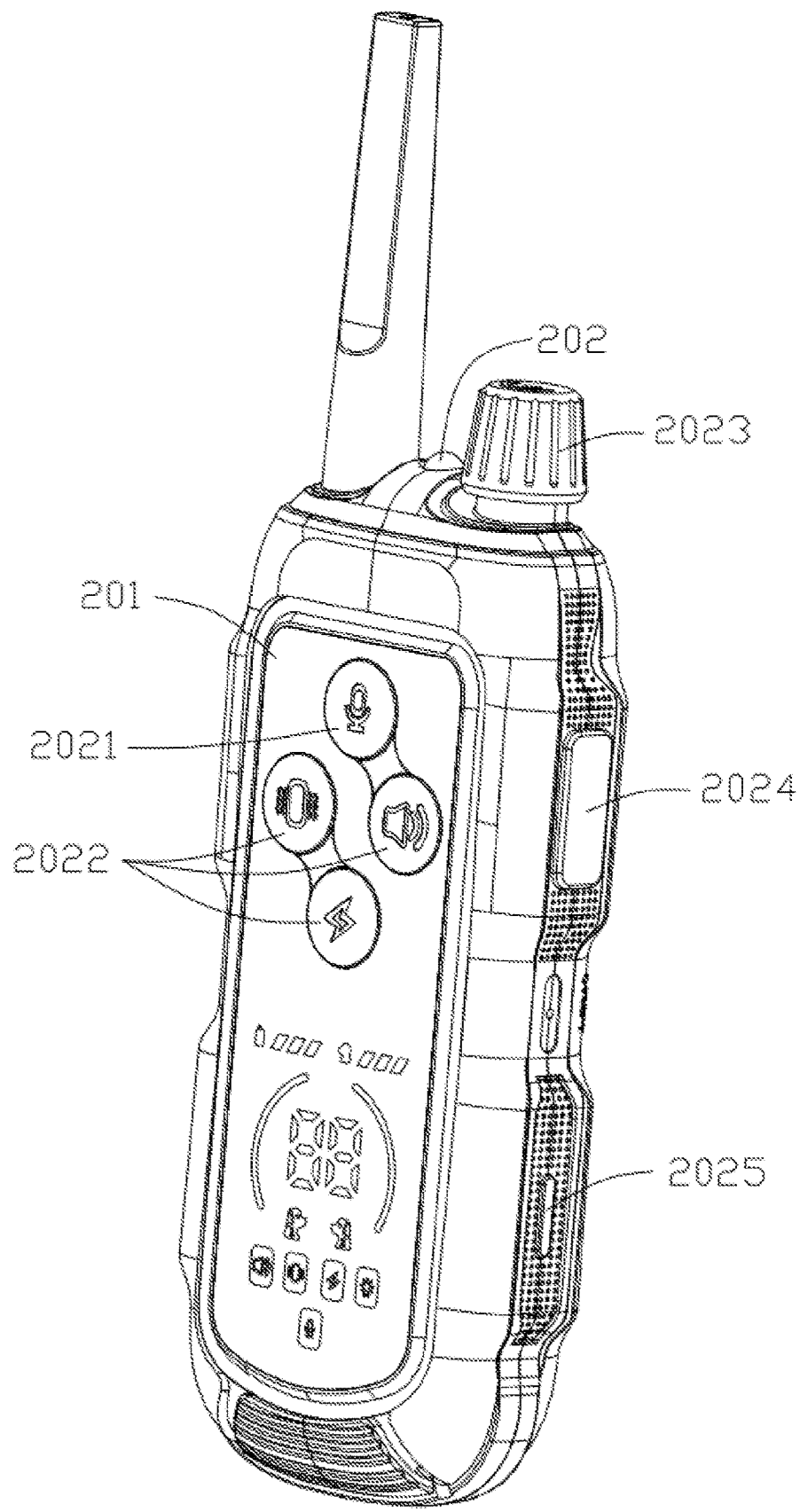
FIG. 8 is a three-dimensional diagram of a dog training controller according to the present disclosure.
Figure 9:
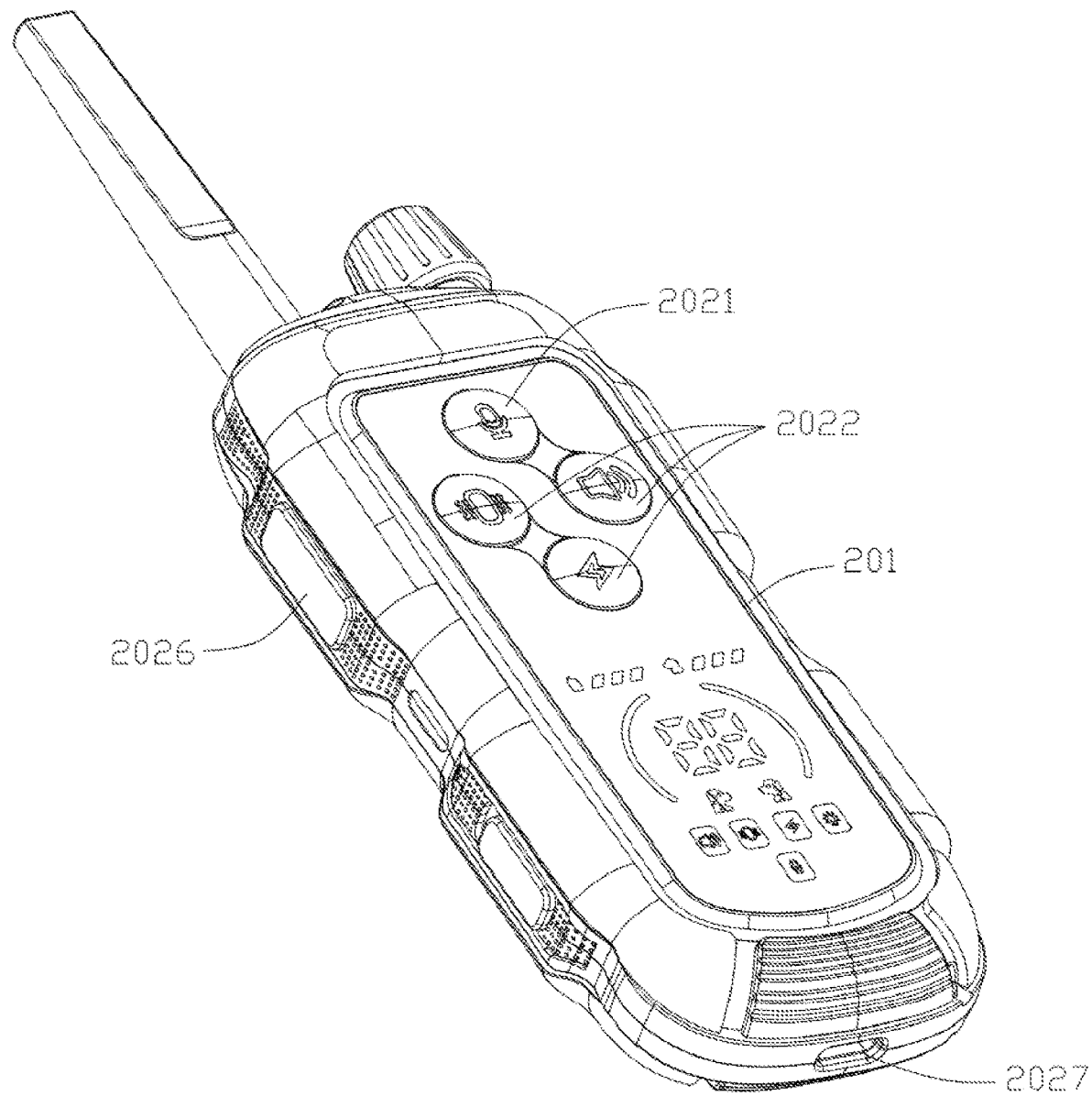
FIG. 9 is a three-dimensional diagram of a dog training controller in another viewing angle according to the present disclosure.
Figure 10:
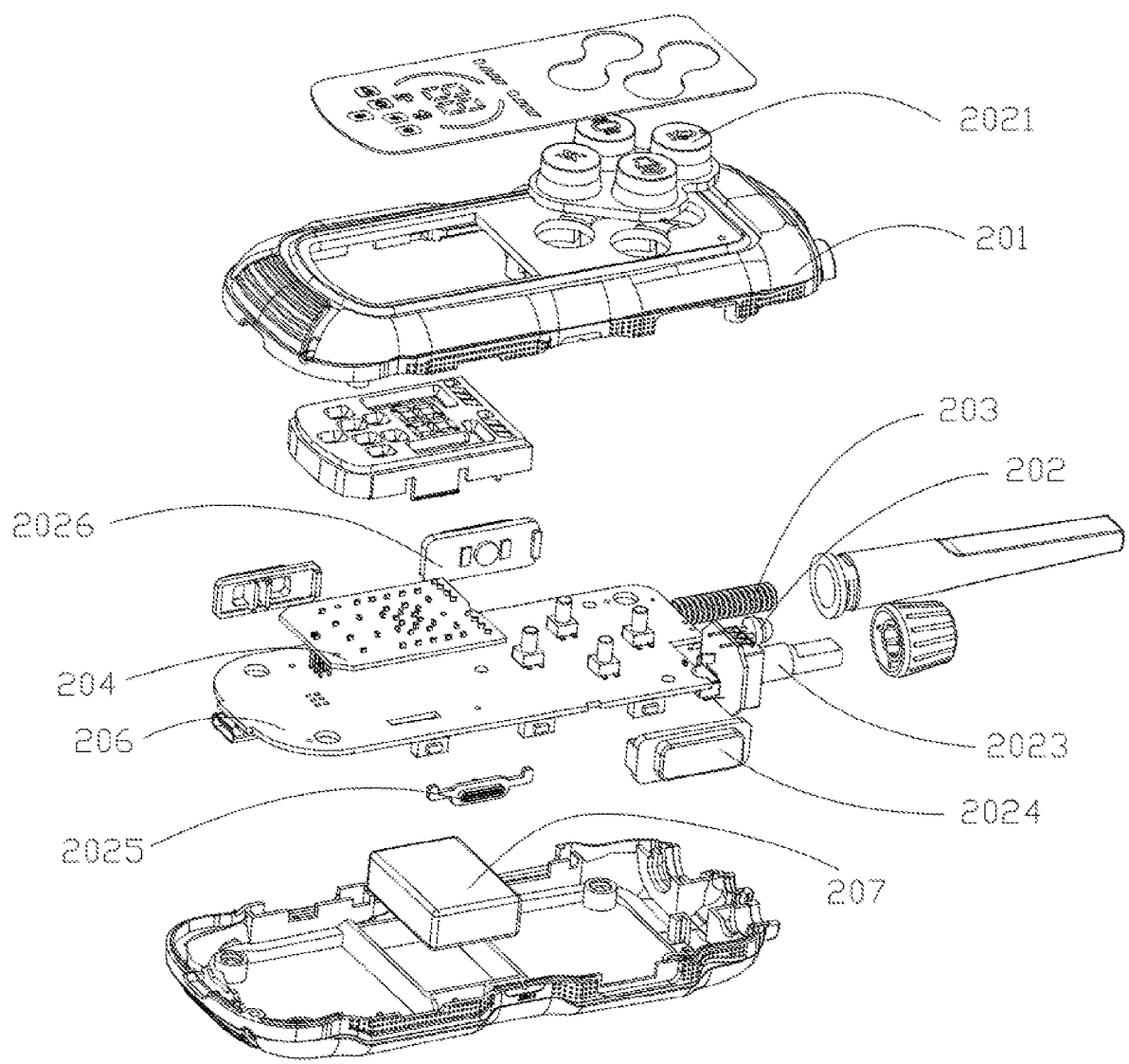
FIG. 10 is an exploded view of a dog training controller according to the present disclosure.

Referring to FIG. 2 to FIG. 4, in the above embodiment, the receiver 100 includes a first housing 101, a display arranged on the first housing 101, and a first circuit board 105 and a first battery 104 which are arranged inside the first housing 101. The storage module 130, the first communication module 120, and the control module 140 are all arranged on the first circuit board 105; the dog training module 160 is arranged on the first housing 101; the motion sensing unit 114 and the speaker module 150 are arranged inside the first housing 101; the speaker module 150 includes a speaker 102; and the first housing 101 is provided with a sound outlet 1011 at a position corresponding to the speaker 102.

The display can be configured to display a battery life of the first battery 104, strength of the dog training module 160, a state of the dog training module 160, and the like. The sound stimulation training unit 161 and the speaker module 150 are the same module, that is, the sound stimulation module also includes a speaker 102, and audios that stimulate the target dog can also be played through the speaker 102. Of course, in other embodiments, the sound stimulation dog training unit 161 and the speaker module 150 are different modules, that is, they each have parts for playing sounds.

The electric stimulation dog training unit 162 can be a conducting column; the vibration dog training unit 163 can be a vibration motor; and the ultrasonic dog training unit 164 can be an ultrasonic transmitting unit. In the optimal embodiment, for the compactness of the structure of the receiver 100 of the interactive dog training device, the speaker 102 and the first battery 104 are both located on the same side of the first circuit board 105. The conducting column is electrically connected to the first circuit board 105 and is located on one side of the first circuit board 105 away from the speaker 102. The vibration motor is located on one side of the first circuit board 105 away from the speaker 102. The conducting column at least partially protrudes out of an outer side of the first housing 101. When the receiver 100 of the interactive dog training device is worn on the target dog, the conducting column can be in contact with the skin of the target dog, so that the user can stimulate the target dog by outputting a voltage through the conducting column during triggering of electrical stimulation, to achieve a training effect. The motion sensing unit 114 is arranged on the first circuit board 105, and the display is located on one side of the first housing 101 away from the conducting column, that is, the display is located on the outer side, so that it is convenient for the user to watch the display. The first housing 101 is provided with avoidance ports 1012 at two ends of one side close to the conducting column, and crossbars 1013 configured to fix a collar are arranged on the avoidance ports 1012. The collar can be fixed through the avoidance ports 1012 and crossbars 1013 to meet the use of the collar. In this way, when the receiver 100 of the interactive dog training device is worn on the target dog, one side surface of the receiver 100 of the interactive dog training device can better abut against the target dog, so that the conducting column is in better contact with the skin of the target dog.

Both the sound collection unit 112 and the recording module 180 can be pickups that are electrically connected to the control module 140. The pickups can be microphones, or the like. Specifically, the pickups are located on the first circuit board 105 and can be located on the same or different sides of the speaker 102. In addition, the first housing 101 is provided with pickup holes 1014 at positions corresponding to the pickups.

For the convenience of use by the user when the user approaches the target dog, the first housing 101 is also provided with a function button 1015 that is electrically connected to the first circuit board 105. The function button 1015 can be configured to control turning on and turning off of the receiver 100 of the interactive dog training device, adjust the strength of the dog training module 160, and turning on, turning off, and switching the dog training module 160.

Based on the receiver 100 described in any of the above embodiments, this embodiment also provides an interactive dog training device.

Referring to FIG. 5 to FIG. 10, the interactive dog training device includes the receiver 100 described in any of the above embodiments and a dog training controller 200.

In this embodiment, the dog training controller 200 is a remote controller. Specifically, at least one of the dog training controller 200 or the receiver 100 of the interactive dog training device is configured to be in communication connection with an external intelligent terminal 300 to feed back target dog- or environment-related data to the intelligent terminal 300. It should be understood that when the dog training controller 200 is in communication connection with the external intelligent terminal 300, the dog training controller 200 wirelessly transmits the obtained or detected target dog- or environment-related data to the intelligent terminal 300. When the receiver 100 is in communication connection with the external intelligent terminal 300, the receiver 100 wirelessly transmits the acquired or detected data related to the obtained or detected target dog- or environment-related data to the intelligent terminal 300 for the user to learn about. The smart terminal 300 can be a mobile phone, a tablet, a computer, or the like.

In an embodiment, the dog training controller 200 has a dog training control button 2022 and an interaction control button 2021. When the dog training control button 2022 is operated, the dog training controller 200 sends a dog training control signal. When the interaction control button 2021 is operated, the dog training controller 200 sends an interaction control signal. Specifically, there are a plurality of dog training control buttons 2022 configured to transmit different dog training control signals respectively, so as to achieve that the receiver 100 drives the corresponding dog training module 160 to work, switches the strength of dog training, or the like. There are a plurality of interaction control buttons 2021 configured to transmit different interaction control signals respectively.

In an embodiment, the dog training controller 200 further includes a switching button 2024. There are at least two receivers 100. The dog training controller 200 is configured to be in communication connection with the at least two receivers 100, and the switching button 2024 is configured to switch control of the dog training controller 200 over the at least two receivers 100. It should be understood that the dog training controller 200 can control use of different receivers 100 through the switching button 2024. Each receiver 100 corresponds to one target dog for use, so that a plurality of receivers 100 are suitable for a plurality of target dogs, allowing the interactive dog training device to adapt to a user with a plurality of target dogs. This can avoid the cost of a plurality of dog training controllers 200 and improves the application scenario and practicality of this embodiment.

In an embodiment, the dog training controller 200 further includes a locking button 2025. When the locking button 2025 is at a first position, the function of the dog training control button 2022 and the function of the interaction control button 2021 are locked, that is, the dog training control button 2022, the interaction control button 2021, and the like are all locked and cannot be operated. When the locking button 2025 is at a second position, the dog training control button 2022 and the interaction control button 2021 can be used and operated normally. Specifically, the switching button 2024 and the locking button can be dial switches, knobs, or the like.

In an embodiment, the dog training controller 200 further includes a rotation button 2023. The rotation button 2023 is configured to be operated to control a grade of dog training stimulation, so as to adjust a punishment intensity according to a mistake of the target dog.

In an embodiment, the dog training controller 200 further includes a lighting module 202 and a lighting control button 2026. The lighting control button 2026 is configured to control turning on and turning off of the lighting module 202. Through the lighting module 202, it is convenient for the user to use the device at night and also convenient for the user to use the device to provide light at night, making it easier to see the environment clearly at night and improving the practicality.

Of course, in other embodiments, the dog training controller 200 may have a touch screen. When the touch screen is touched, button locking, turning on and turning off of the lighting module 202, the stimulation strength of the dog training module 160, sending of the dog training control signal and the interaction control signal, switching of the different receivers 100 for use can be achieved.

In the above embodiment, the dog training controller 200 includes a second housing 201, a second circuit board 206, a second battery 207, a display module 204, and a second communication module 210. The second communication module 210 includes an antenna 203, and the display module 204 is mounted on the second housing 201. The second battery 207, the antenna 203, and the second circuit board 206 are arranged in the second housing 201 and are electrically connected to each other. The dog training control button 2022, the interaction control button 2021, the switching button 2024, the locking button 2025, the lighting module 202, and the rotation button 2023 are all arranged on the second housing 201 and are all electrically connected to the second circuit board 206. The second communication module 210 communicates with the intelligent terminal 300 and the receiver 100 through the antenna 203.

Specifically, the control module 140 of the receiver 100 transmits a detected battery life of the first battery 104 to the dog training controller 200 through the first communication module 120. The second circuit board 206 in the dog training controller 200 receives the battery life of the first battery 104 through the antenna 203 of the second communication module 210 and displays the battery life through the display module 204, so that the user can remotely learn about the battery life of the first battery 104 in the receiver 100 and charge the receiver 100 in a timely manner when there is no power. The second circuit board 206 is also configured to detect a battery life of the second battery 207 and display the battery life through the display module 204. The display module 204 can also be configured to display a strength grade of the dog training module 160, various icons of the dog training module 160 during working, icons displayed during recording, and the like. Specifically, the display module 204 can be a digital tube, a liquid crystal display screen, or the like. The recording module 180 of the receiver 100 can perform recording when being operated by the dog training controller 200 for recording, or the receiver 100 can be configured with a button which is pressed to trigger the recording module 180 for recording. A knob button can be a knob switch when pressed. When pressed, the knob button is configured to send a recording instruction to the receiver 100 or switch the dog training module 160, so that the grade strength of the dog training module 160 can be adjusted during rotation.

To effectively reduce the volume of the product and make the structure of the dog training controller 200 compact, the dog training control button 2022 and the interaction control button 2021 are located on a front surface of the second housing 201, and the locking button 2025 and the lighting control button 2026 are respectively arranged on two opposite side walls of the second housing 201; the rotation button 2023, the lighting module 202, and the antenna 203 are arranged at a top of the second housing 201; the lighting module 202 is located between the rotation button 2023 and the antenna 203, so that the user can turn on the lighting module 202 through the lighting button, making it convenient to use the lighting module 202. Specifically, the lighting module 202 can be a light-emitting diode (LED) or a surface-mounted lamp.

In the above embodiment, the second battery 207 can be a rechargeable battery, a dry battery, a button battery, or the like. When the second battery 207 is a rechargeable battery, a charging port 2027 for an external power supply is arranged on the second housing 201. After the charging port 2027 is connected to a power supply, the second battery 207 can be charged via the control module 140.

In an embodiment, the first housing 101 is provided with a lighting lamp 103 electrically connected to the control module 140. The lighting lamp 103 can be remotely controlled by the dog training controller 200 to achieve lighting, flashing, turning off, or the like.

In another embodiment, the dog training controller 200 can also be an intelligent terminal 300, wherein the intelligent terminal 300 can be a mobile phone, a tablet, a computer, or the like. That is, the receiver 100 communicates with the intelligent terminal 300, and information of the second battery 207 fed back by the receiver 100 and barking data and state data of the target dog can be received through an APP in the intelligent terminal 300, so that the user can monitor these information and data. An interaction control signal, a dog training control signal, a recording instruction, and turning on and turning off instructions for the lighting lamp 103 can be sent to the receiver 100 through the APP in the intelligent terminal 300, and a strength grade of the dog training module 160 and the like can be adjusted through the APP, so that functions of the dog training controller 200 that serves as the remote controller can be achieved, and wireless communication with the receiver 100 and remote operation performed on the receiver 100 are achieved.

Figure 11:
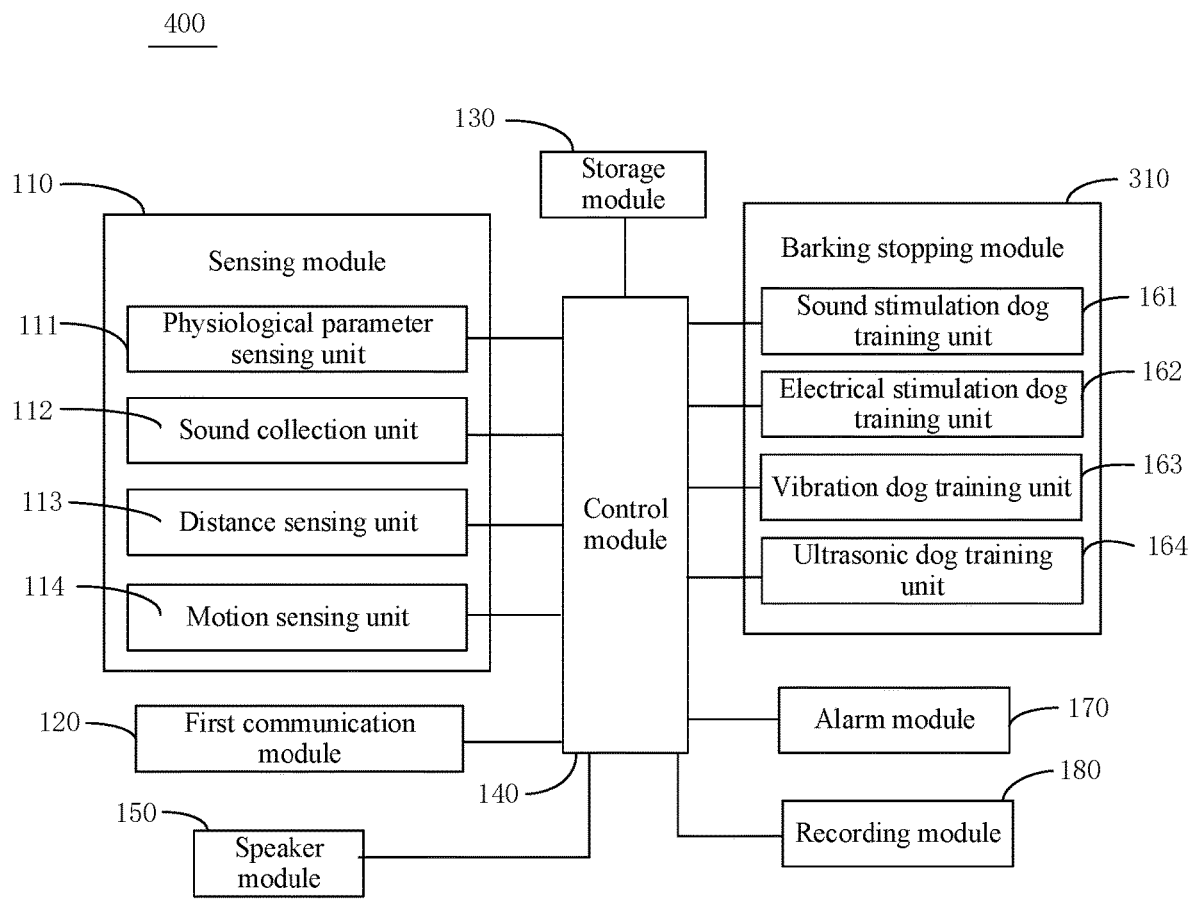
FIG. 11 is a schematic block diagram of a barking control device according to the present disclosure.

During practical applications, the receiver 100 described in any one of the above embodiments can also be used as a barking control device 400, as shown in FIG. 11. The dog training module 160 is a barking stopping module 310. That is, when the target dog barks, the control module 140 can stimulate the target dog through the barking stopping module 310 to achieve an effect of punishing the target dog, and the target dog will stop barking when stimulated. Thus, the barking stopping effect is achieved.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A receiver of an interactive dog training device, comprising:
   a dog training module;
   a speaker module;
   a storage module, configured to store user sound data;
   a first communication module, configured to: communicate with a dog training controller and receive an interaction control signal and a dog training control signal which are sent by a dog training controller; and
   a control module, electrically connected to the dog training module, the speaker module, the storage module, and the first communication module, wherein the control module is configured to receive the interaction control signal and the dog training control signal through the first communication module, obtain the user sound data according to the interaction control signal, and then play the obtained user sound data through the speaker module; and the control module is further configured to provide dog training stimulation to the target dog according to the dog training control signal for dog training.

2. The receiver of the interactive dog training device according to claim 1, wherein there are a plurality of groups of the user sound data and a plurality of interaction control signals, and each interaction control signal corresponds to one group of user sound data.

3. The receiver of the interactive dog training device according to claim 1, wherein the receiver of the interactive dog training device further comprises a sensing module electrically connected to the control module; the sensing module comprises a sound collection unit; the sound collection unit is configured to pick up a sound, convert the picked sound into a sound signal, and output the sound signal to the control module; and the control module is also configured to receive the sound signal and send the sound signal to the dog training controller through the first communication module.

4. The receiver of the interactive dog training device according to claim 3, wherein the control module is also configured to analyze the number of times of barking of the target dog within a preset time range according to the sound signal and/or analyze a barking state of the target dog to obtain state data of the target dog, and send the number of times of barking and the state data to the dog training controller through the first communication module.

5. The receiver of the interactive dog training device according to claim 4, wherein the state data comprises data of the number of times of barking of the target dog of one day, one week, or one month.

6. The receiver of the interactive dog training device according to claim 4, wherein a barking template is preset inside the control module; the control module is also configured to match the sound signal with the preset barking template; when the control module determines that the sound signal is a barking state corresponding to the barking template, the control module obtains the barking state corresponding to the barking template as the state data and transmits the state data to the dog training controller through the first communication module; and the barking template comprises at least one barking state representing hunger, fear, alertness, anger, grievance, sadness, illness, excitement, and agitation.

7. The receiver of the interactive dog training device according to claim 3, wherein the sensing module further comprises a physiological parameter sensing unit; and the physiological parameter sensing unit is configured to detect at least one of a body temperature, a heart rate, a blood pressure, sleep time, exercise steps, and exercise energy consumption of the target dog; and the control module is also configured to send at least one of the body temperature, the heart rate, the blood pressure, the sleep time, the exercise steps, and the exercise energy consumption of the target dog to the dog training controller.

8. The receiver of the interactive dog training device according to claim 3, wherein the sensing module further comprises a distance sensing unit configured to sense a distance between the receiver of the interactive dog training device and an interaction controller or a preset position; and when the distance is greater than or equal to a preset distance value, the control module sends an over range reminding signal to the dog training controller.

9. The receiver of the interactive dog training device according to claim 1, wherein the receiver of the interactive dog training device further comprises a recording module, and the control module is further configured to: control the recording module to record the user sound data and store the user sound data in the storage module.

10. The receiver of the interactive dog training device according to claim 9, wherein the receiver comprises a first housing, and a first circuit board and a first battery which are arranged inside the first housing; the storage module, the first communication module, and the control module are all arranged on the first circuit board; the dog training module is arranged on the first housing; the speaker module is arranged inside the first housing; the speaker module comprises a speaker; and the first housing is provided with a sound outlet at a position corresponding to the speaker.

11. The receiver of the interactive dog training device according to claim 10, wherein the dog training module comprises at least one of a sound stimulation dog training unit, an electrical stimulation dog training unit, a vibration dog training unit, and an ultrasonic dog training unit.

12. The receiver of the interactive dog training device according to claim 11, wherein the electric stimulation dog training unit is a conducting column; the vibration dog training unit is a vibration motor; the speaker and the first battery are both located on the same side of the first circuit board; the conducting column is electrically connected to the first battery; the vibration motor and the conducting column are both located on one side of the first circuit board away from the speaker; the conducting column at least partially protrudes out of an outer side of the first housing;

the first housing is provided with avoidance ports at two ends of one side close to the conducting column, and crossbars configured to fix a collar are arranged on the avoidance ports.

13. An interactive dog training device, comprising the receiver according to claim 1 and the dog training controller.

14. The interactive dog training device according to claim 13, wherein at least one of the dog training controller or the receiver of the interactive dog training device is configured to be in communication connection with an external intelligent terminal to feed back target dog- or environment-related data to the intelligent terminal.

15. The interactive dog training device according to claim 13, wherein the dog training controller has a dog training control button and an interaction control button; when the dog training control button is operated, the dog training controller sends the dog training control signal; and when the interaction control button is operated, the dog training controller sends the interaction control signal.

16. The interactive dog training device according to claim 15, wherein the dog training controller further comprises a switching button; there are at least two receivers; the dog training controller is configured to be in communication connection with the at least two receivers; and the switching button is configured to switch control of the dog training controller over the at least two receivers.

17. The interactive dog training device according to claim 16, wherein the dog training controller further comprises a locking button; when the locking button is at a first position, a function of the dog training control button and a function of the interaction control button are locked; and when the locking button is at a second position, the dog training control button and the interaction control button are used and operated normally.

18. The interactive dog training device according to claim 17, wherein the dog training controller further comprises a rotation button; the rotation button is configured to be operated to control a grade of the dog training stimulation; the dog training controller further comprises a lighting module and a lighting control button; and the lighting control button is configured to control turning on and turning off of the lighting module.

19. The interactive dog training device according to claim 18, wherein the dog training controller comprises a second housing, a second circuit board, a second battery, a display module, and a second communication module; the second communication module comprises an antenna, and the display module is mounted on the second housing; the second battery, the antenna, and the second circuit board are arranged in the second housing and are electrically connected to each other; and the dog training control button, the interaction control button, the switching button, the lighting module, the locking button, and the rotation button are all arranged on the second housing and are all electrically connected to the second circuit board.

20. The interactive dog training device according to claim 19, wherein the dog training control button and the interaction control button are located on a front surface of the second housing, and the locking button and the lighting control button are respectively arranged on two opposite side walls of the second housing; the rotation button, the lighting module, and the antenna are arranged at a top of the second housing; and the lighting module is located between the rotation button and the antenna.

* * * * *